(12) United States Patent
James

(10) Patent No.: US 7,832,911 B2
(45) Date of Patent: Nov. 16, 2010

(54) MOTORCYCLE SAFETY DEVICE

(76) Inventor: Jesse L. James, 2976 Calmgarden Rd., Acton, CA (US) 93510

( * ) Notice: Subject to any disclaimer, the term of this patent is extended or adjusted under 35 U.S.C. 154(b) by 342 days.

(21) Appl. No.: 12/110,967

(22) Filed: Apr. 28, 2008

(65) Prior Publication Data

US 2009/0268478 A1    Oct. 29, 2009

(51) Int. Cl.
  *F21V 33/00*    (2006.01)
(52) U.S. Cl. .................... 362/473; 362/475; 340/472
(58) Field of Classification Search ............. 362/183, 362/190, 191, 194, 249.05, 249.13, 253, 362/276, 368, 396, 466, 473, 475, 476, 486, 362/540, 544, 545, 548, 549, 800, 802, 331, 362/432, 469, 472
See application file for complete search history.

(56) References Cited

U.S. PATENT DOCUMENTS

| | | | | |
|---|---|---|---|---|
| 4,847,738 A * | 7/1989 | Nehl | ........................... | 362/200 |
| 4,860,177 A * | 8/1989 | Simms | ........................ | 362/473 |
| 5,077,643 A * | 12/1991 | Leach | ........................ | 362/183 |
| 5,195,817 A | 3/1993 | Deccio | | |
| 5,561,414 A * | 10/1996 | Chin | ........................... | 340/432 |
| 5,645,340 A * | 7/1997 | Colton | ........................ | 362/489 |
| 5,820,254 A | 10/1998 | Duenas | | |
| 6,135,625 A * | 10/2000 | Kodaira et al. | .............. | 362/476 |
| 6,398,394 B1 * | 6/2002 | Winnik | ....................... | 362/490 |
| 6,565,241 B1 | 5/2003 | Glynn | | |
| 6,783,040 B2 * | 8/2004 | Batchelor | .................... | 224/413 |
| 6,939,155 B2 * | 9/2005 | Postrel | ....................... | 439/297 |
| 7,192,169 B2 * | 3/2007 | Takeda | ........................ | 362/475 |
| 2005/0180150 A1 * | 8/2005 | Okada et al. | ................. | 362/473 |

FOREIGN PATENT DOCUMENTS

| | | | |
|---|---|---|---|
| DE | 3642263 A | * | 12/1987 |
| JP | 2002059781 A | * | 2/2002 |

* cited by examiner

*Primary Examiner*—Hargobind S Sawhney
(74) *Attorney, Agent, or Firm*—Dale J. Ream

(57) ABSTRACT

A motorcycle safety device includes a housing and a mount for coupling the housing to a motorcycle. A light assembly is removably coupled to the housing, the light assembly including a casing, a light positioned inside the casing, a lens coupled to the casing, and a battery positioned inside the casing. An input is in communication with the light to selectively cause the light to illuminate an area in front of the housing. A processor, tilt sensor, timer, and speaker are coupled to the housing, the tilt sensor and timer being in data communication with the processor. The processor includes programming to actuate at least one of the light and speaker upon the tilt sensor detecting a tilt event for a predetermined amount of time measured by the timer.

20 Claims, 4 Drawing Sheets

MOTORCYCLE SAFETY DEVICE

BACKGROUND OF THE INVENTION

This invention relates generally to lighting systems and, more particularly, to a motorcycle safety device that includes a light assembly and sensors for activating the light assembly or other safety devices in the event of a crash. In addition, the light assembly may be activated manually in periods of darkness.

Although racing-type motorcycles are typically operated during daylight hours such that traditional headlights are usually unnecessary, recreational riding of these types of motorcycles may find a rider out beyond sundown with little or no light to guide his way. In addition, a recreational or off-road motorcycle rider may be miles away from other persons and have limited means of communication with others, especially if he were to have an accident. If a cyclist were to have an accident, engine trouble, or if it were too dark to continue riding, he would have to walk or otherwise not be found for a considerable amount of time.

Various devices have been proposed in the art for providing removable or portable lighting for a motorcycle. Although assumably effective for their intended purposes, the existing devices do not adequately provide removable, battery powered lighting for a motorcycle and do not also provide for detection of a possible crash or other emergency situation.

Therefore, it would be desirable to have a motorcycle safety device that may be easily mounted to a racing motorcycle. Further, it would be desirable to have a motorcycle safety device that includes a sensor that detects a potential crash. In addition, it would be desirable to have a motorcycle safety device that includes a communicating device for informing other riders if one rider is in distress.

SUMMARY OF THE INVENTION

Therefore, a motorcycle safety device according to the present invention includes a housing and a mount for coupling the housing to a motorcycle. A light assembly is removably coupled to the housing, the light assembly including a casing, a light positioned inside the casing, a lens coupled to the casing, and a battery positioned inside the casing. An input is in communication with the light to selectively cause the light to illuminate an area in front of the housing. A processor, tilt sensor, timer, and speaker are coupled to the housing, the tilt sensor and timer being in data communication with the processor. The processor includes programming to actuate at least one of the light and speaker upon the tilt sensor detecting a tilt event for a predetermined amount of time measured by the timer.

A general object of this invention is to provide a motorcycle safety device that provides enhanced safety to a racing motorcycle.

Another object of this invention is to provide a motorcycle safety device, as aforesaid, that includes a light assembly mountable to a motorcycle and a sensor for detecting a potential crash.

Still another object of this invention is to provide a motorcycle safety device, as aforesaid, in which the light assembly is detachable from the motorcycle for independent use.

Yet another object of this invention is to provide a motorcycle safety device, as aforesaid, in which a beam angle of the light assembly is adjustable.

A further object of this invention is to provide a motorcycle safety device, as aforesaid, having crash detection features that avoid false alarms or premature alarms.

Another object of this invention is to provide a motorcycle safety device, as aforesaid, that is easy and cost effective to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A safety device for a two-wheeled vehicle (e.g., a motorcycle, bicycle, etc.) will now be described in detail with reference to FIG. 1 through FIG. 4 of the accompanying drawings. More particularly, the safety device 100 includes a housing 110 and a light assembly 120. "Motorcycle" is used herein to denote any two-wheeled vehicle, whether motorized or not.

Figure 1:
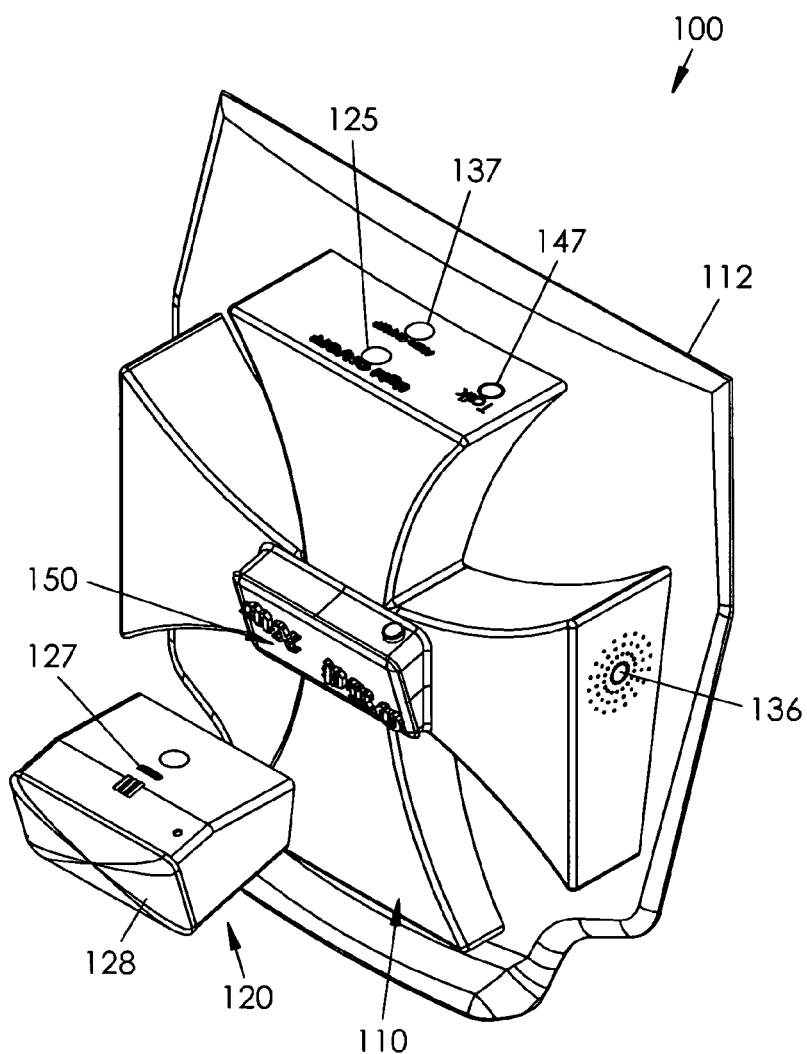
FIG. 1 is a perspective view of a motorcycle safety device according to a preferred embodiment of the present invention.
Figure 2:
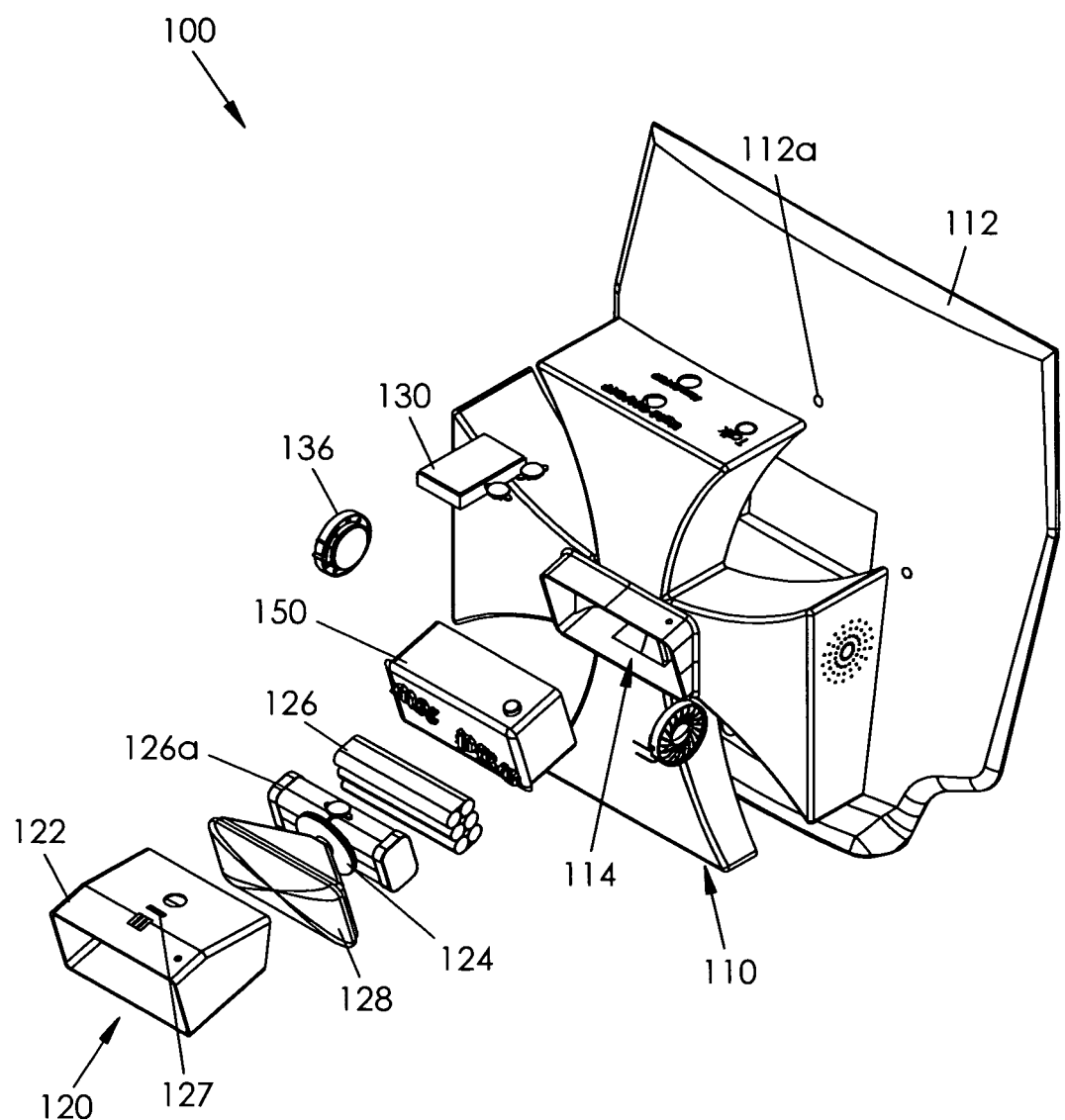
FIG. 2 is an exploded view of the motorcycle safety device as in FIG. 1.

As shown in FIGS. 1 and 2, the safety device 100 includes a mount 112 for coupling the housing 110 to the two wheeled vehicle. The mount may be a plate 112 and bolts may pass through holes 1 12a (as shown in FIG. 2) to couple the housing 110 to the plate 112 and sandwich a portion of the two wheeled vehicle therebetween, or any other mount (i.e., any other coupling system) may be used.

The light assembly 120 is removably coupled to the housing 110. As shown in FIG. 2, the housing 110 may define a cavity 114 and the light assembly 120 may be removably positioned in the housing cavity 114. The light assembly 120 includes a casing 122, a light 124 inside the casing 122, and a battery 126 inside the casing 122 (FIG. 2). The battery 126 may be particularly contained in a battery holder 126a. The light 124 may be a LED or any other appropriate light, and an input 125 (FIG. 1) is in communication with the light 124 to selectively cause the light 124 to illuminate an area in front of the housing 110. A LED may be particularly suitable as the light 124 because of its sturdy construction and low energy requirements.

The light assembly 120 may include one or more solar cells (not shown) for collecting sun energy, the solar cells being electrically connected to the battery 126 for recharging the battery 126. Therefore, energy collected during the daylight—when the two wheeled vehicle is most likely to be used—will be readily available to keep the battery charged for nighttime use of the light assembly 120.

The light assembly 120 may further include a lens 128 coupled to the casing 122, and the light assembly 120 may be adjustable to focus illumination from the light 124 in a relatively narrow beam when at a first configuration and focus illumination from the light 124 in a relatively wide beam when at a second configuration. An input 127 (FIG. 2) may be in communication with the light assembly 120 to change the light assembly 120 between the first and second configurations. For example, a user input 127 may change interior reflective and/or focusing properties of the casing 122.

Figure 3:
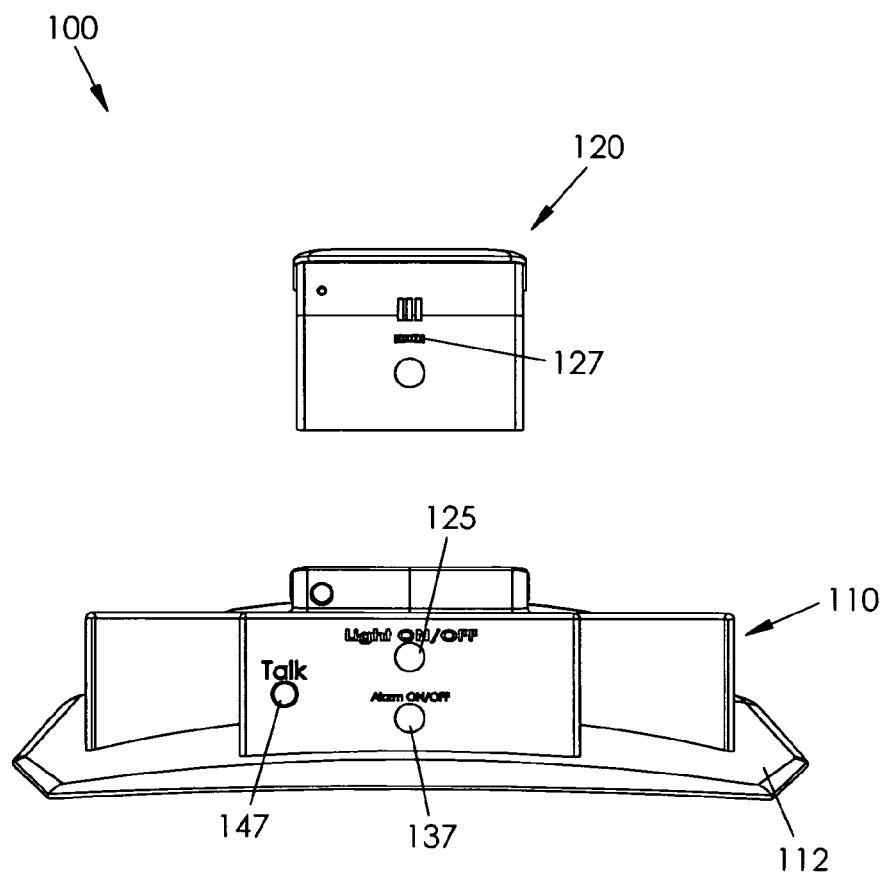
FIG. 3 is a top view of the motorcycle safety device as in FIG. 1.

As shown in FIG. 2, a processor 130 may be coupled to (e.g., inside) the housing 110. A tilt sensor 132 (FIG. 4) may be coupled to (e.g., inside) the housing 110 and in data communication with the processor 130 to inform the processor 130 of tilt events, a timer 134 (FIG. 4) may be coupled to (e.g., inside) the housing 110 and in data communication with the processor 130, and a speaker 136 may be coupled to (e.g., inside) the housing 110 and in data communication with the processor 130. Programming may be included in the processor 130 to actuate the light 124 and/or the speaker 136 upon the tilt sensor 132 detecting a tilt event for a predetermined amount of time measured by the timer 134. As shown in FIG. 3, a user input 137 may be in communication with the processor 130 to actuate and deactivate the described programming and/or to deactivate the light 124 and/or the speaker 136.

Figure 4:
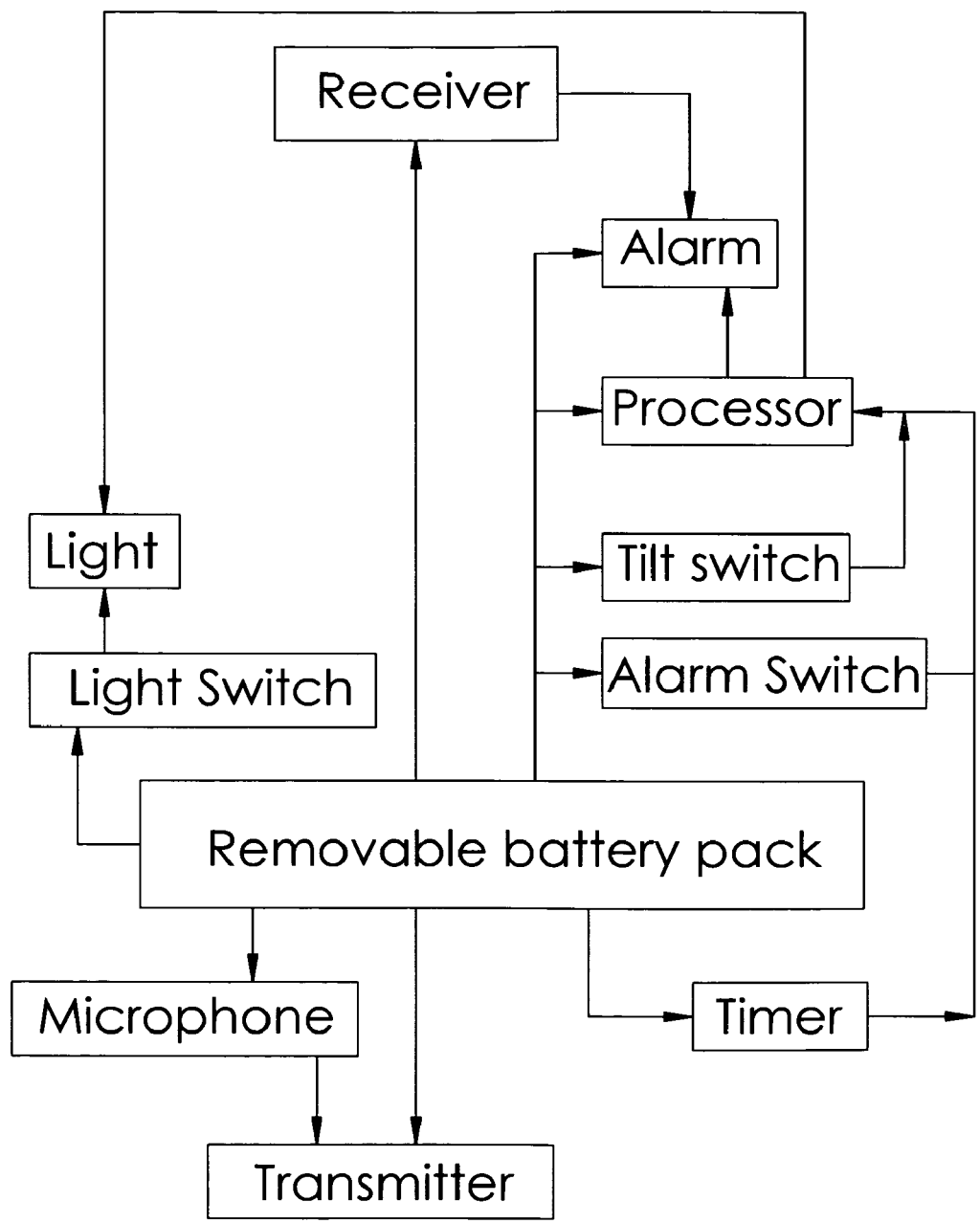
FIG. 4 is a block diagram illustrating the electronic components of the motorcycle safety device according to the present invention.

A microphone 140 may be coupled to the housing 110, and a transmitter 142 may be in communication with the microphone 140 to transmit messages input to the microphone 140, as shown in FIG. 4. A receiver 144 may be in communication with the speaker 136 to play messages received by the receiver 144 over the speaker 136 (FIG. 4). As shown in FIG. 3, a user input 147 may be in communication with the microphone 140 to actuate the microphone 140.

The battery 126 may be in electrical communication with the light 124, the processor 130, the tilt sensor 132, the timer 134, the microphone 140, the transmitter 142, the speaker 136, and the receiver 144 when the light assembly 120 is coupled to (e.g., inside) the housing 110 (FIG. 4). Alternately, multiple batteries may be used to power the various components.

As shown in FIG. 1, a cover 150 may be removably coupled to the housing 110 to enclose the housing cavity 114. In one embodiment, only one of the cover 150 and the light assembly 120 may be coupled to the housing 110 at one time.

In use, the mount 112 couples the housing 110 to the motorcycle, such as by sandwiching a portion of the motorcycle between the housing 110 and the mount 112. To light the path of the motorcycle, the light assembly 120 may be coupled to the housing 110 and the user may operate the input 125 to cause the light 124 to activate. As set forth above, either a relatively wide beam of illumination or a relatively narrow beam of illumination may be selected using the input 127.

If the motorcycle happens to overturn, the tilt sensor 132 may detect the tilt event, and the programming may cause the processor 130 to actuate the light 124 and/or the speaker 136 after the predetermined amount of time is measured by the timer 134 while the tilt event is detected. This may indicate the accident to others (which may be particularly useful in crowded areas) and may make the motorcycle easy to locate (which may be particularly useful in remote and uncrowded areas). Further, if an accident occurs, the user may input a distress message into the microphone 140, and the distress signal may be transmitted by the transmitter 142 to a friend or aid agency. The microphone 140 and the transmitter 142 may be actuated automatically after the tilt sensor 132 detects the tilt event for the predetermined amount of time, or the user input 147 may be used to actuate the microphone 140 and the transmitter 142. The receiver 144 and speaker 136 may additionally be used to allow two-way communication.

If the light 134 is not needed (such as during daylight hours), the light assembly 120 may be removed from the housing 110 and the cover 150 may instead be coupled to the housing 110. If the battery 136 in the light assembly 120 is the only power source for the electrical components, removal of the light assembly may render the remaining electrical features inoperable but may remove the greatest amount of weight from the safety device 100 (which may be important in race conditions, etc.). If additional power sources are employed, remaining electrical components may operate after the light assembly 120 is removed, but the resultant weight of the safety device 100 may be increased due to the extra batteries.

It is understood that while certain forms of this invention have been illustrated and described, it is not limited thereto except insofar as such limitations are included in the following claims and allowable functional equivalents thereof.

The invention claimed is:

1. A safety device for a two wheeled vehicle, comprising:
a housing defining a cavity;
a mount for coupling said housing to said two wheeled vehicle;
a light assembly removably positioned in said housing cavity; said light assembly including a casing, a light inside said casing, a lens coupled to said casing, and a battery inside said casing;
an input in communication with said light to selectively cause said light to illuminate an area in front of said housing;
a processor in said housing;
a tilt sensor in said housing and in data communication with said processor;
a timer in said housing and in data communication with said processor; and
programming in said processor to actuate at least one of said light and a speaker upon said tilt sensor detecting a tilt event for a predetermined amount of time measured by said timer.

2. The safety device of claim 1, further comprising:
a microphone coupled to said housing;
a transmitter in communication with said microphone to transmit messages input to said microphone;
a speaker coupled to said housing; and
a receiver in communication with said speaker to allow said speaker to play messages received by said receiver.

3. The safety device of claim 2, wherein said battery is in electrical communication with said processor, said tilt sensor, said timer, said microphone, said transmitter, said speaker, and said receiver when said light assembly is in said housing cavity.

4. The safety device of claim 3, further comprising a cover removably coupled to said housing, said cover enclosing said housing cavity when coupled to said housing, only one of said light assembly and said cover being coupled to said housing at one time.

5. The safety device of claim 4, wherein:
said light is a LED;
said light assembly is adjustable to focus illumination from said light in a relatively narrow beam when at a first configuration and focus illumination from said light in a relatively wide beam when at a second configuration; and
said safety device further comprises an input in communication with said light assembly to change said light assembly between said first and second configurations.

6. The safety device of claim 1, wherein said light is a LED.

7. The safety device of claim 1, further comprising a cover removably coupled to said housing, said cover enclosing said housing cavity when coupled to said housing, only one of said light assembly and said cover being coupled to said housing at one time.

8. The safety device of claim 1, wherein said light assembly is adjustable to focus illumination from said light in a relatively narrow beam when at a first configuration and focus illumination from said light in a relatively wide beam when at a second configuration, and wherein said safety device further comprises an input in communication with said light assembly to change said light assembly between said first and second configurations.

9. A motorcycle safety device, comprising:
a housing;
a mount for coupling said housing to said motorcycle;
a light assembly removably coupled to said housing; said light assembly including a casing, a light inside said casing, a lens coupled to said casing, and a battery inside said casing;
an input in communication with said light to selectively cause said light to illuminate an area in front of said housing;
a processor coupled to said housing;
a tilt sensor coupled to said housing and in data communication with said processor;
a timer coupled to said housing and in data communication with said processor;
a speaker coupled to said housing; and
programming in said processor to actuate at least one of said light and said speaker upon said tilt sensor detecting a tilt event for a predetermined amount of time measured by said timer.

10. The safety device of claim 9, further comprising:
a microphone coupled to said housing;
a transmitter in communication with said microphone to transmit messages input to said microphone;
a speaker coupled to said housing; and
a receiver in communication with said speaker to allow said speaker to play messages received by said receiver.

11. The safety device of claim 10, wherein said battery is in electrical communication with said processor, said tilt sensor, said timer, said microphone, said transmitter, said speaker, and said receiver when said light assembly is coupled to said housing.

12. The safety device of claim 11, further comprising a cover removably coupled to said housing, wherein only one of said light assembly and said cover is capable of being coupled to said housing at one time.

13. The safety device of claim 12, wherein:
said light is a LED;
said light assembly is adjustable to focus illumination from said light in a relatively narrow beam when at a first configuration and focus illumination from said light in a relatively wide beam when at a second configuration; and
said safety device further comprises an input in communication with said light assembly to change said light assembly between said first and second configurations.

14. The safety device of claim 9, further comprising a cover removably coupled to said housing, wherein only one of said light assembly and said cover is capable of being coupled to said housing at one time.

15. The safety device of claim 9, wherein said light assembly is adjustable to focus illumination from said light in a relatively narrow beam when at a first configuration and focus illumination from said light in a relatively wide beam when at a second configuration, and wherein said safety device further comprises an input in communication with said light assembly to change said light assembly between said first and second configurations.

16. A safety device for a two wheeled vehicle, comprising:
a housing;
a mount for coupling said housing to said two wheeled vehicle;
a light assembly removably coupled to said housing; said light assembly including a casing, a light inside said casing, and a battery inside said casing;
an input in communication with said light to selectively cause said light to illuminate an area in front of said housing;
a microphone coupled to said housing;
a transmitter in communication with said microphone to transmit messages input to said microphone;
a speaker coupled to said housing; and
a receiver in communication with said speaker to allow said speaker to play messages received by said receiver.

17. The safety device of claim 16, wherein said battery is in electrical communication with said microphone, said transmitter, said speaker, and said receiver when said light assembly is coupled to said housing.

18. The safety device of claim 17, wherein:
said housing defines a cavity; and
said light assembly is removably positioned in said housing cavity.

19. The safety device of claim 18, further comprising a cover removably coupled to said housing, wherein only one of said light assembly and said cover is capable of being coupled to said housing at one time.

20. The safety device of claim 16, wherein said housing defines a cavity and said light assembly is removably positioned in said housing cavity; and further comprising a cover removably coupled to said housing, wherein only one of said light assembly and said cover is capable of being coupled to said housing at one time.

* * * * *